United States Patent [19]

Fischer et al.

[11] Patent Number: 4,598,039

[45] Date of Patent: Jul. 1, 1986

[54] FORMATION OF FEATURES IN OPTICAL MATERIAL

[75] Inventors: Frederick H. Fischer, Allentown; Edmond J. Murphy, Bethlehem; Trudie C. Rice, North Whitehall Township, Lehigh County, all of Pa.

[73] Assignee: AT&T Bell Laboratories, Murray Hill, N.J.

[21] Appl. No.: 627,025

[22] Filed: Jul. 2, 1984

[51] Int. Cl.$^4$ ................................................. G03C 5/00
[52] U.S. Cl. ....................................... 430/323; 430/324; 430/945; 430/321; 430/296; 430/394; 430/322; 219/121 LH; 219/121 LA; 219/121 LK; 219/121 LJ; 219/121 LL; 219/121 EJ; 219/121 EK; 219/121 LD; 156/643; 156/272.8; 156/DIG. 8
[58] Field of Search ............... 430/945, 321, 322, 323, 430/296, 394, 324; 219/121 LH, 121 LA, 121 LK, 121 LJ, 121 LL, 121 EJ, 121 EK, 121 LD; 156/643, 272.8, DIG. 8

[56] References Cited

U.S. PATENT DOCUMENTS

| | | | |
|---|---|---|---|
| 3,626,143 | 12/1971 | Fry | 219/121 |
| 3,668,028 | 6/1972 | Short | 156/643 |
| 4,044,222 | 8/1977 | Kestenbaum | 219/121 LL |
| 4,092,518 | 5/1978 | Merard | 219/121 |
| 4,320,281 | 3/1982 | Cruickshank et al. | 219/121 LD |
| 4,324,850 | 4/1982 | Tomita et al. | 430/396 |

OTHER PUBLICATIONS

"Efficient LiNbO$_3$ Balanced Bridge Modular/Switch with an Ion-Etched Slot", American Institute of Physics, M. Minakata, Appl. Phys. Lett. 35(1), Jul. 1, 1979, pp. 40–42.
"Effects of High-Power Laser Radiation", *Academic Press*, J. F. Ready, 1971, pp. 114–117.
"Absorption Phenomena in Metal Drilling with Nd–Lasers", *IEEE Journal of Quantum Electronics*, vol. QE-14, No. 2, M. Von Allmen et al., Feb. 1978, pp. 85–88.
"Guide for Material Processing by Lasers", *Laser Institute of America*, Second Edition—1978, pp. 5-4–5-5.
"Laser-Enhanced Etching and Material Processing", *CLEO '83*, May 17–20, 1983, p. 214.
"Nd:YAG Laser-Irradiation-Induced Damage to LiNbO$_3$ and KDP", IEEE Journal of Quantum Electronics, M. Bass, Jul. 1971, pp. 350–359.
"Optically-Induced Physical Damage to LiNbO$_3$, Proustite, and LiIO$_3$", ASTM Proc. of Symposium on Damage in Laser Materials, W. D. Fountain et al., 1971, pp. 91–97.
"Lasers in Industry", Van Nostrand Reinhold Company, Edited by S. S. Charschan, pp. 146–147.
"Bubble Forming Media for Optical Recording", *CLEO 1981*, W. B. Robbins et al., Jun. 11, 1981, pp. 2–15.
"Characteristics of Bubble-Forming Optical Direct-Read-After-Write (DRAW) Media", *SPIE*, vol. 329, Optical Disk Technology, R. P. Freese et al., 1982, pp. 174–180.
"Trilayer Bubble-Forming Optical Recording Media", *SPIE*, vol. 329, Optical Disk Technology, G. A. N. Connell et al., 1982, pp. 166–173.

*Primary Examiner*—Won H. Louie
*Attorney, Agent, or Firm*—James H. Fox

[57] ABSTRACT

A laser or other source of radiant electromagnetic energy removes optically transparent material (e.g., LiNbO$_3$) to form various structures. To enhance coupling the radiant energy to the optical material, a layer of an ablative absorber (e.g., a metal or organic material) can be used. Alternately, the radiant source can be initially operated above a threshold that causes removal of a surface layer of the optical material. After selectively thus removing a surface layer of the optical material, subsequent sub-threshold applications of radiant energy remove additional optical material due to a change in the underlying material, rendering it more absorptive at the wavelength of the electromagnetic energy. Optical devices, including waveguides, can be formed, as well as isolation grooves, alignment structures, etc.

30 Claims, 7 Drawing Figures

FORMATION OF FEATURES IN OPTICAL MATERIAL

BACKGROUND OF THE INVENTION

1. Field of the Invention

The present invention relates to a technique for forming devices and other articles in optical material wherein radiant electromagnetic energy removes selected regions of the material.

2. Description of the Prior Art

Lithium niobate and other birefringent crystals have been investigated for use in a wide range of optical systems. Recently, it has been proposed to use such crystals in the fabrication of electro-optic guided wave devices. These devices are used to perform various functions on optical energy, such as switching, polarizing, combining, separating, etc. This optical energy typically carries information transmitted over optical fibers. However, the chemically inert nature of most of the birefringent crystal materials has been an obstacle in attempting to generate a simple etchant. In particular, lithium niobate and other materials are highly resistant to etching in chemical systems and plasma systems, including reactive ion etching systems. The removal of material (i.e., etching), is an important operation for the production of many devices in optical materials. For example, a known type of optical switch utilizes a groove between parallel optical paths; see for example, "Efficient LiNbO₃ Balanced Bridge Modulator/Switch With an Ion-Etched Slot" by M. Minakata, Applied Physics Letters, Vol. 35, pp. 40–42 (1979). As is noted therein, an ion beam can be used to etch material from the optical substrate. However, an ion beam system is not always practical in production. This is due in part to the need for processing in a vacuum, and the limited amount of beam energy that can be obtained at reasonable cost in an ion generator. For these and other reasons, it is apparent that it is desirable to have an improved technique for selectively removing material from optical substrates.

The use of laser energy is known for vaporizing various materials. In the case of highly reflective materials (for example, most metals) it is known to coat the material with an absorber, or otherwise modify its surface, to increase the absorbence of laser energy. In this manner, even highly reflective materials can be drilled or machined with laser energy. It is also known to indent the surface of a reflective metal conductor, in order to trap laser energy, and thereby heat bonding material more efficiently; see U.S. Pat. No. 4,320,281. In the field of optical information recording, it is known to coat a relatively transparent optical disc material with a more absorbent layer, in order to promote laser vaporization of pits in the transparent layer. However, this typically relies on the ability of a single laser pulse to effect the desired removal of the transparent material, since the absorbent layer is also removed by the laser pulse.

SUMMARY OF THE INVENTION

We have invented a technique for fabricating articles whereby radiant electromagnetic energy, is directed at optical material. A surface pattern is formed in the optical material by an initial application of the radiant electromagnetic energy. In one embodiment, the surface pattern is formed by applying the radiant electromagnetic energy at a power density above a threshold which induces removal of the optical material. In another embodiment, the surface pattern is formed by applying the radiant electromagnetic energy to an ablative absorbing layer on the surface of the optical material. After thus initially forming the surface pattern, subsequent sub-threshold applications of radiant electromagnetic energy are utilized to remove additional material underlying the surface. The subsequent applications of radiant energy may cover an area wider than the pattern initially defined, thereby obtaining a self-aligned structure. The radiant energy type in the subsequent applications may be different than that of the initial application. A laser is typically used as the source of the radiant electromagnetic energy, but a noncoherent type may alternately be used.

DETAILED DESCRIPTION

The following detailed description relates to a technique for forming features in optical material by means of multiple applications of electromagnetic energy thereto. The electromagnetic energy may be in the form of a laser beam, as used illustratively herein. Other sources of radiant electromagnetic energy are also possible, as noted below. The term "optical material" as used herein means a material that allows a useful amount of optical energy to propagate therein or therethrough. Many useful optical materials exhibit birefringence, wherein optical energy of one polarization propagates at a different speed than optical energy of a different (e.g., orthogonal) polarization. Also, many useful optical materials are electro-optic; that is, they exhibit a change in their index of refraction where a voltage is applied across the material. However, the present invention is not limited to materials exhibiting these effects.

The present technique results in part from our discovery that an increased absorption of electromagnetic energy (i.e., "darkening" of the material) can be obtained in an underlying layer of optical material as electromagnetic energy removes the overlying material. We have found that this is so even though the electromagnetic power density is below a threshold amount which by itself produces an increased absorption in undarkened regions of the optical material. Further, we have discovered that the increased absorption can be propagated from an overlying layer to an underlying layer, as the electromagnetic energy removes the overlying layer at a power density below threshold. As further discussed below, the initial removal of material in a first application of electromagnetic energy can be facilitated by means of a surface ablative layer. Alternately, the initial removal can be accomplished without the ablative layer by applying the electromagnetic energy at a power density above the above-noted threshold.

Figure 1:
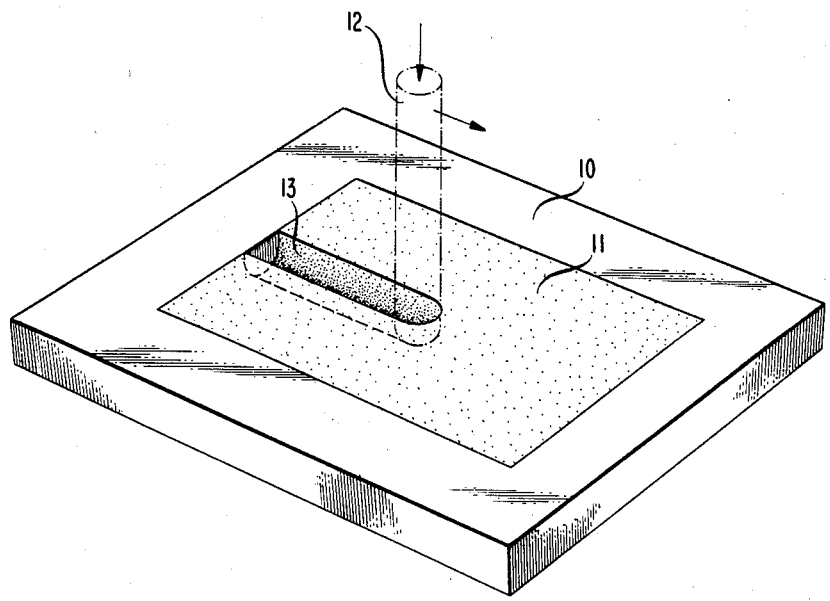
FIG. 1 illustrates forming a groove that is defined by the width of a laser beam in an optical material having an ablative layer thereon.

The present technique may be practiced with a laser beam as a convenient source of high-power electromagnetic radiation. Referring to FIG. 1, a substrate 110 of an optical material has coated thereon an ablative layer 11, across which is scanned a laser beam 12, producing a groove 13 in the optical material. Note that while a collimated laser beam 12 is shown, a focussed beam can alternately be used, to provide for a greater degree of control of spot size and energy density. In the present technique, the optical material can be lithium niobate or other materials that undergo a change in optical absorption due to the application of the laser beam, as discussed further below. The ablative layer 11 is an organic or inorganic material that absorbs at the wavelength of the laser beam 12. We have determined that many normally reflective metals can effectively serve as ablative layers in practicing the present invention. This is due in part to an increase in the absorptivity of some metals at high laser intensities; see for example, *Effects of High-Power Laser Radiation*, J. F. Ready, Academic Press, New York, at pages 115–116 (1971). The use of metals is especially convenient when they are to be utilized in other processing steps on the optical material, as discussed further below.

The ablative layer is, per unit thickness, relatively more absorbent of the laser energy than the relatively more transparent optical material. The optical material utilized herein typically absorbs less than 1 percent, and more typically less than 0.1 percent, of the laser energy normal to a 10 micrometer thickness of the material, at laser power levels below the darkening threshold. One purpose of the ablative coated layer is to increase the absorption of the laser beam, as compared to the absorption that would occur in the substantially transparent optical material 10. The laser is operated at a sufficiently high power level to ablate, that is remove, the ablative layer, typically in a single application of the laser beam thereto. Furthermore, the energy of the laser beam is sufficiently high that the heat produced by the absorption in the ablative layer etches an initial feature 13 in the surface of the optical material. The etched feature is frequently referred to as a "groove" herein, but other shapes are possible, including isolated holes (or "pits"), and more complex structures.

Figure 2:
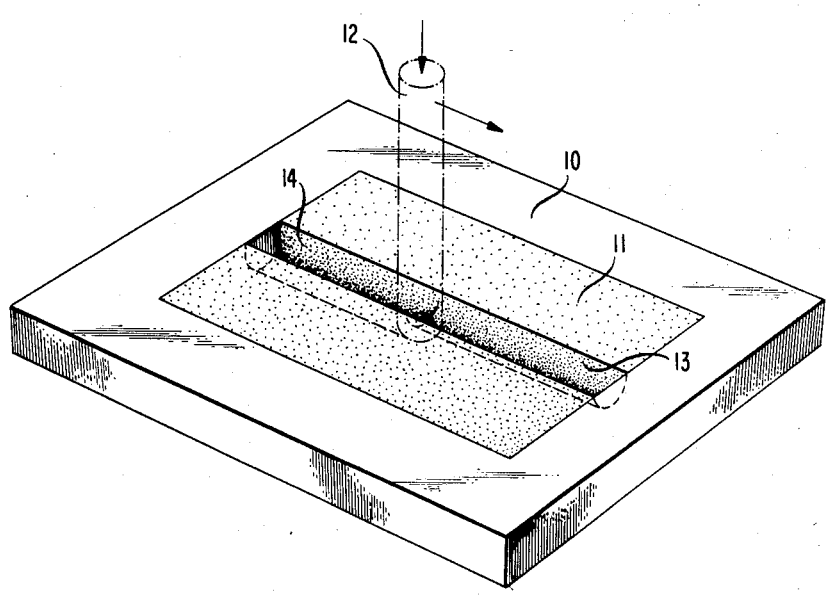
FIG. 2 illustrates propagating the groove initially formed in FIG. 1 further into the optical material.
Figure 3:
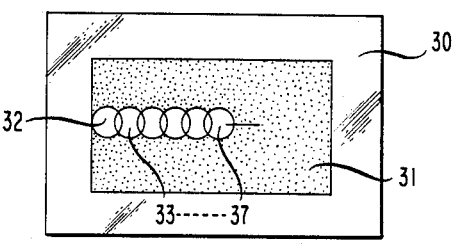
FIG. 3 shows a top view of overlapped spots formed by a pulsed laser.

Referring to FIG. 2 it is one aspect of the present invention that the laser beam 12 is then passed a second (or more) time along the groove initially formed. Even though the ablative layer has been removed in this region of the optical substrate, an increase in absorptivity of the optical material has been produced by the initial laser application such that the subsequent applications remove additional material. We have found that this process is self-propagating; that is, as one layer of material is removed, the absorptivity of the underlying layer is increased, allowing additional removal by subsequent laser applications. While a continuous-wave laser can be used, the laser used in the Examples is of the pulsed type, wherein the laser dwells at a single point sufficiently to perform at least a portion of the removal required at that position, and then moves on to an adjacent region. FIG. 3 shows overlapping pits 32–37 formed by multiple laser pulses. It can be seen that the smoothness of the groove will be infuenced by the degree of overlap of the laser pulse, as is apparent to practitioners in the laser art. Furthermore, smoother groove sidewalls may be obtained in some cases by removing only a portion of the desired depth at a given location in a given laser pass along the groove. Then, one or more additional laser passes along the groove remove the rest of the material to the desired depth. Staggering the position of the laser spots (in the case of a pulsed laser) from one pass to the next can also be used to provide smoother sidewalls.

Figure 4:
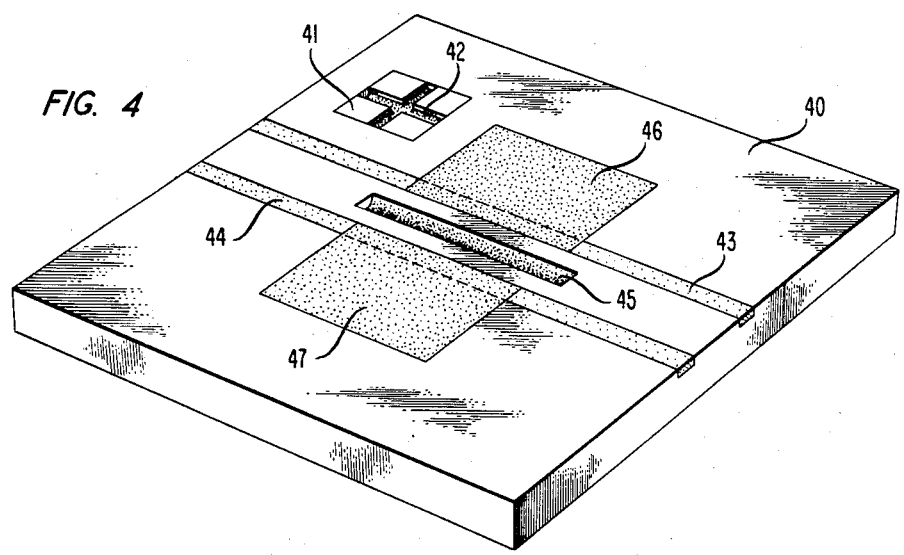
FIG. 4 shows an optical switch and alignment feature formed by the inventive technique.

A variety of structures can be formed by the present technique. Referring to FIG. 4, there is shown in simplified form a known type of optical switch wherein optical energy can be switched from optical path 43 to optical path 44 or vice-versa. These optical paths can be, for example, titanium that is diffused into a lithium niobate crystal according to procedures known in the art. The switching of this device is controlled by applying a voltage to metal pads 46 and 47, which produce an electric field across the optical paths, and so change the index of refraction of the optical material according to principles known in the art. A groove 45 shown between the optical paths is an integral feature of this device; see for example, the Minakata, article noted above. The groove 45 can be produced by the present technique. In addition, an alignment feature 42 can be produced in a portion of the optical substrate 40. This alignment groove can be made early in the production sequence, and thereafter serve as an optical alignment mark for positioning the subsequently formed features shown.

A typical sequence of operations for forming the device in FIG. 4 is as follows: The lithium niobate (or other optical material) is cut to form the substrate 40. An ablative layer, for example aluminum, is applied in region 41. The alignment marks are then etched to form grooves 42 by means of the present technique. The remaining ablative material (outside of the grooves) is then stripped off. The waveguides 43 and 44 are then formed by diffusing titanium into the substrate 40. An insulating layer of silicon dioxide (not shown) is then deposited over the substrate 40. A layer of aluminum is then deposited over the silicon dioxide layer. This layer is then patterned by conventional means to produce electrodes 46 and 47 that control the switching of waveguides 43 and 44. Also, the aluminum forms an ablative layer (not shown) along the length of the substrate in which groove 45 is to be subsequently formed. The metal can also be selectively deposited again in region 41, convering both the alignment grooves 42 and surrounding regions. This can provide for increased contrast for optically aligning the substrate. After this second aluminum layer is deposited, the groove 45 is then formed by the present technique.

Figure 5:
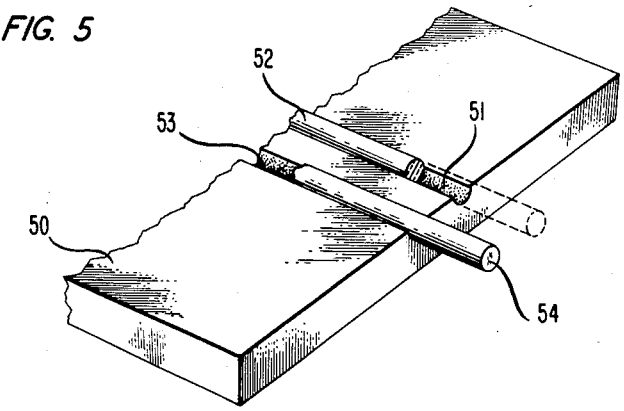
FIG. 5 shows optical fibers located in grooves formed according to the inventive technique.

In addition to the applications shown in FIG. 4, the grooves formed by the present technique are also advantageously used to optically isolate adjacent optical devices or waveguides. This is due to the difference of index of refraction of typical optical materials and the air inside a groove. If desired, filling material can be placed within the groove to modify the difference in the index of refraction or for other purposes, such as providing a planar surface for forming subsequent features thereon, etc. An additional use for grooves formed by the present technique is shown in FIG. 5, wherein optical fibers 52 and 54 are place in grooves 51 and 53 formed by the present technique. These optical fibers can couple light into devices or waveguides (not shown) on the optical substrate. Furthermore, grooves formed by the present technique can be used as an alignment feature between two (or more) optical substrates. That is, alignment ridges can be formed on a second optical substrate (not shown) that are keyed to fit within the grooves formed within a first optical substrate. It is apparent that still other device mounting and alignment structures can be advantageously formed by the present technique. Furthermore, holes can be formed within an optical substrate by the present technique, for accessing the opposite side of an optical substrate. This can be useful for making electrical or optical connections to structures that are formed on, or communicate with, the opposite side of the substrate.

The details of the present technique will be more fully illustrated by means of the following Example.

EXAMPLE I

A commercially available laser system was used to perform the laser etching process. The system incorporated a device handler which offers X, Y, Z, and theta rotational movement, and was used to mount and align the crystal. An acousto-optic, Q-switched Nd:YAG laser provided the energy used to generate the etched regions. The laser was configured to lase in the fundamental $TEM_{00}$ mode at the 1.06 μm wavelength with a randomly polarized output. The laser was capable of producing output energies as high as 150 μJ in a 45 nanosecond pulse (as measured at the $e^{-1}$ points). A camera and video monitor provided an image of the work area, which was desirable to perform various alignment procedures. A beam positioning subsystem was used to control the location of the laser beam and the camera scan field.

The top surface of a $LiNbO_3$ crystal was initially coated with a 500 Å layer of aluminum. Next, the crystal was mounted on a device handler which was subsequently moved beneath the laser/camera focusing lens. The height of the handler was adjusted to position the top (coated) surface of the device slightly below the plane of focus of the laser beam. The beam waist was approximately 6 μm at this level. A series of alignments were performed, and a reference point established for all subsequent moves.

In a previous experiment, no apparent removal of material was obtained when firing 150 μJ pulses at an uncoated $LiNbO_3$ crystal. However, with the aluminum-coated crystal, it was found that both the aluminum layer and a surface layer of the $LiNbO_3$ crystal were removed for laser energies above 2.5 μJ/pulse. The first pulse was found to produce a raised rim of material around the pit produced by the laser pulse. Furthermore, after a pit was generated in the aluminum and surface layer of the crystal by the first pulse, the process was found to be self propagating. That is, no redeposition of aluminum was necessary to remove further material with subsequent laser pulses. A scanning Auger microprobe analysis indicated that there was no aluminum remaining in the target region after the first pulse. It was thus apparent that a different mechanism was involved in the absorption of the subsequent pulses. We estimate that molten optical material formed by the initial pulse resolidifies as various oxides of lithium and niobium. The new material apparently absorbs infrared and visible wavelengths; consequently, a new absorbing layer is generated with each subsequent pulse.

It was found that laser power could be varied to achieve a range of pit diameters at the crystal surface. The pit diameter also increased with the number of incident pulses. This occurred until the pit region assumed the same diameter as the original raised rim. The walls of the pit became slightly cratered. The relationship of the pit volume with respect to the incident laser power was found to be approximately linear over the range investigated. No crystal damage was observed at laser energy densities below 2.5 μJ/pulse, although the aluminum film was ablated in the 1.5-2.5 μJ/pulse range.

Power densities in the $10^7$-$10^9$ W/cm² range have been investigated as above. At these power densities, the absorption of aluminum at λ=1.06 μm is approximately 10 to 30 percent. A qualitative estimate (ignoring heat transport and assuming C independent of T) of the temperature change, ΔT, of a given volume of material, V, due to absorption of the incident laser energy is given by:

$$\Delta T = E * \text{Molecular Weight}/C * \rho * V.$$

Here, E is the energy of the laser pulse (in joules), C is the molar heat capacity (an estimated 90J/K*mole) and ρ is the density (4.64 g/cm³). The crude estimates show that for all materials considered, temperatures are obtainable which exceed the respective boiling points. A series of experiments was also accomplished at a 0.53 micrometer laser wavelength, by frequency doubling the Nd:YAG laser output by means of a nonlinear crystal. It was found that smoother surfaces of grooves could be obtained with overlapped spots (e.g., FIG. 3) at this wavelength than at the 1.06 micrometer wavelength. The laser focal point was maintained at a fixed distance with respect to the surface of the optical material, as noted above. However, it is also possible to change the focal distance. For example, the focal distance can be increased from the laser as optical material is removed, in order to maintain a high power density at the bottom of the groove, or to ensure a desired profile of the sidewalls, or for other purposes.

EXAMPLE II

This Example shows the formation of an isolation groove by the inventive technique. An optical waveguide approximately 1 centimeter long and 6 μm wide was formed by diffusing titanium into lithium niobate. A groove was formed by the inventive technique alongside the waveguide. The groove was approximately 2 millimeters long, 5 μm deep, and the edge of the groove was about 1 to 5 μm from the edge of the diffused titanium ridge. Optical fibers were coupled to each end of the waveguide, and optical energy at a wavelength of 1.3 μm was directed through the waveguide. The waveguide loss was measured to be about 1.5 db. This result is comparable to the loss from a comparable waveguide structure without the groove alongside, showing that the presence of the groove did not significantly affect the loss. It is estimated that most of the observed loss was due to a difference in the shape of the mode propagating in the optical fibers as compared to the waveguide. It was also observed that the shape of the single propagating mode in the waveguide was affected by the presence of the groove. In particular, the "tails" of the Gaussian energy distribution of the propagating mode were eliminated. We estimate that this effect can advantageously be used to reduce the optical loss in curved waveguides, by placing a curved groove alongside the waveguide. The optical energy leakage that occurs from the tails is then substantially reduced.

The foregoing result indicates that grooves formed by the present technique can be used to define an optical waveguide. That is, spaced parallel grooves formed by the inventive technique can themselves form an acceptably low-loss waveguide, since the refraction index of the optical material (e.g., LiNbO$_3$) is higher than that of the air, or even various filling materials, in the groove. If additional guiding is desired to prevent light leakage from the bottom of the waveguide into the optical substrate, an index-of-refraction-increasing dopant (e.g., titanium) can be diffused into the optical material to the desired depth, either before or after the formation of the grooves. This diffusion may be non-selective; that is, the dopant may be introduced over an entire optical substrate. Hence, the present technique may be used to avoid the necessity of patterning and etching titanium or other dopant material.

While aluminum has been shown as the ablative layer, other materials are possible. Metals that are very reflective under normal conditions have been found to produce results substantially similar to aluminum. Successful results have been obtained with titanium, copper, gold, and palladium as absorbent ablative layers. Generally, thicknesses in the range of 200 to 2000 Å are optimum. A layer that is too thin does not provide for sufficient absorption of the incident laser radiation, whereas too thick a layer conducts heat away from the desired area too rapidly. However, we estimate that thicknesses at least in the range of 0.01 micrometers (100 Å) to 1 micrometer can be successfully used, with a still wider range being possible, depending upon the laser energy available and the laser wavelength. The use of organic ablative materials is also possible. For example, we estimate that a photoresist can be used, and has the advantage that it can be easily applied by spin-on techniques to provide a well controlled thickness and uniformity over a wide area. However, we have found that a typical commercial photoresist does not couple sufficient energy into the optical material to cause the initial removal of material. This is apparently because typical photoresists are optimized to absorb at wavelengths shorter than the 1.06 micrometers of a Nd:YAG laser. Hence, we recommend including a dye absorber to increase photoresist absorption at this wavelength. Still other organic and inorganic materials are possible for the ablative layers.

The present invention can also be practiced without the use of an ablative layer by applying the laser (or other type of radiant electromagnetic) energy at a power density above a threshold that produces surface damage in the optical material. As used herein, the term "threshold" is defined as the minimum power density of a given type of radiant electromagnetic energy necessary to remove a surface layer from an uncoated optical material; i.e., without the ablative layer. (When the ablative layer is used, the initial application of radiant energy can then be above or below threshold). Note that the surface pattern can be formed using a different type of radiant electromagnetic energy than that used to subsequently propagate the pattern into the optical material. Hence, the threshold may be different for the two types of radiant energy since they may be absorbed differently by the optical material. The surface feature is then propagated into the material at power density below the threshold of the subsequently applied radiant energy. For example, a frequency doubled Nd:YAG laser operating at 0.53 micrometers wavelength produces damage in a lithium niobate crystal above a threshold of about 7.5 micro joules per pulse, for a beam diameter of about 6 micrometers. (At the 1.06 micrometer wavelength of the laser no damage was observed up to the 150 micro joule per pulse power limit of the laser used.) Still shorter wavelengths can be advantageously used. For example, ultraviolet excimer lasers operating at a wavelength of 192 nm are known to produce darkening in LiNbO$_3$, and can be used to form the surface pattern, or to propagate the pattern into the optical material, or both. Hence, in one embodiment of the present technique, the feature desired can be first etched on the surface of the optical material at a laser power above the surface damage threshold, and can be thereafter propagated into the material at a laser power below that threshold. As with the ablative layer embodiment, this propagation is due to the enhanced absorption of laser energy for layers underlying the surface layer.

Figure 6:
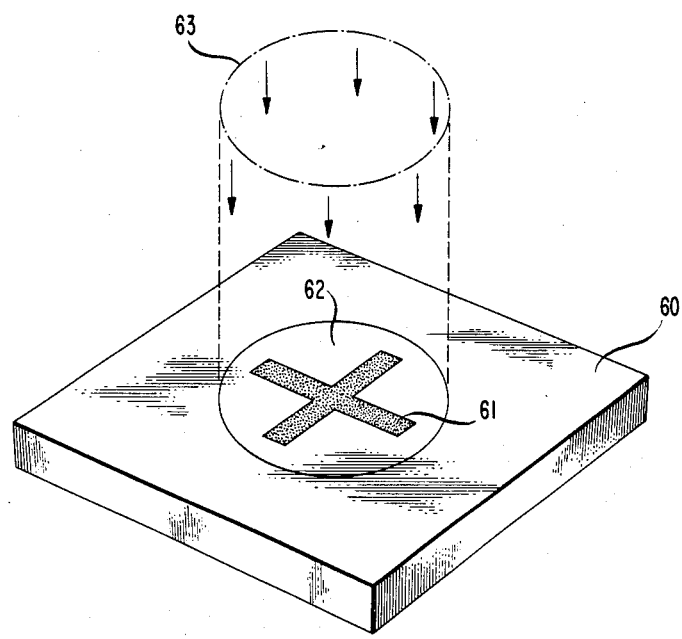
FIG. 6 shows propagating a feature into an optical material by a stationary laser beam covering a relatively wider area then the pattern initially formed.
Figure 7:
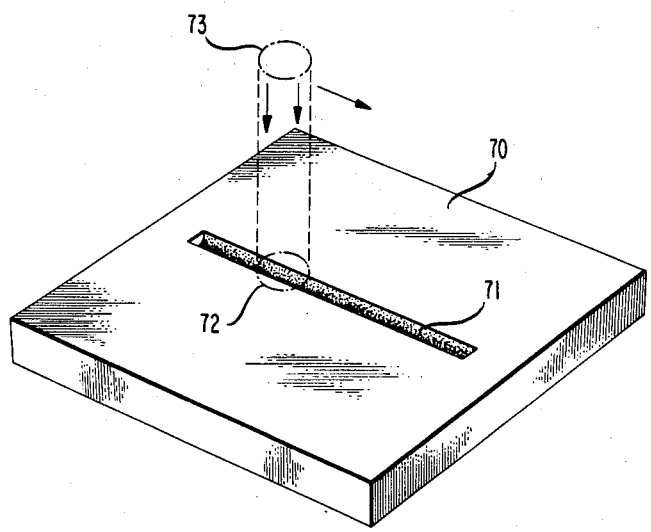
FIG. 7 shows propagating a feature into an optical material by scanning a laser having a relatively wider area as compared to a feature initially formed.

This "sub-threshold propagation" of the etched pattern allows, for example, a self-aligned production of the desired pattern. For example, referring to FIG. 6, a pattern 61 can be initially formed in the surface of optical material 60 either by the deposition of an ablative layer or by operating a scanning laser above the damaged threshold to form the pattern shown. Next, a relatively wide area laser beam 63 can be applied at a power level below threshold in order to propagate the pattern 61 into the optical material 60. Even though the laser beam 63 covers a wider area 62 then that of the pattern 61, only the desired pattern will be propagated into the optical material 60 since the laser beam is below the damaged threshold outside of the desired pattern area. Furthermore, it is shown in FIG. 7 the desired feature 71 can be formed in the optical material 70 either by means of an ablative layer or by means of a first application of laser energy above the damage threshold. Then the structure 71 can be propagated into the optical substrate by means of a relatively broader beam laser 73 that is scanned as shown across the substrate. One advantage of this technique is that the laser beams 63 and 73 need not be precisely aligned to the initially formed feature. Hence, the process is "self-aligned" for propagating the feature into the substrate.

While lithium niobate has been noted above for use with the present technique, other optical materials have been utilized. For example, strontium barium niobate (SrBaNbO$_3$) has been found to behave substantially the same as lithium niobate, both with and without ablative absorber material, both at the wavelength of 1.06 micrometers and 0.53 micrometers. The damage thresholds and the energy necessary to propagate a pattern into the substrate at a subthreshold level were substantially similar. Lithium tantalate (LiTaO$_3$) was also successfully patterned by the present technique at a wavelength of 0.53 micrometers. However, power densities were higher than for the above two materials. For example, the threshold to produce a surface feature without the use of an ablative absorber was approximately 30 micro joules per pulse at a wavelength of 0.53 micrometers for a beam diameter of approximately 6 micrometers. Once formed the feature could be propagated into the material below threshold.

As a control to verify the physical effects observed, substrates of glass, fused quartz, and quartz were each coated with an aluminum ablative layer and subjected to laser radiation as above. It was found that damage pits were formed on the first pulse of laser radiation but that subsequent pulses had no effect. That is, the feature was not propagated into the depth of the substrate. Combined with the results on the above noted optical materials, it is apparent that a change in the absorptivity of the materials occurs due to the initial application of laser radiation either with an absorber, or without an absorber above threshold, and that this change in absorptivity is propagated into the underlying layers, allowing them to be removed by subsequent sub-threshold applications of radiant energy. We observe that the results with lithium niobate and strontium barium niobate are substantially similar, at both 1.06 and 0.53 micrometer laser wavelength. However, lithium tantalate required a higher laser energy to obtain comparable effects at 0.53 micrometers wavelength, and it did not appear to be patternable at the 1.06 micrometers wavelength. Hence, it is possible that the observed phenomenon results from a change in the oxidation state of the niobium (in the case of $LiNbO_3$ and $SrBaNbO_3$) and a change in the oxidation state of tantalum (in the case of $LiTaO_3$). It may also result from the production of color centers in the newly exposed layer. This would not necessarily be accompanied by a change in the chemistry of the material. We postulate that the absorption occurs in a relatively thin absorption layer (for example, having a thickness of 0.1 micrometers or less), even though a relatively thicker layer of material is removed per application of laser energy (for example a depth of about 1 micrometer). However, other explanations for the change in the absorptivity are possible. It appears likely that various other optical materials are suitable for practicing the present invention. In particular, the above explanation indicates that compounds or other materials including at least one metal species are especially well suited for practicing the present invention.

While a laser is a convenient source of high-intensity electromagnetic radiation, other sources, including incoherent radiation sources, can be used. For example, xenon and krypton flash lamps housed in reflective enclosures are used in the semiconductor art for high temperature annealing purposes. At present, these sources radiate at a power density below that obtainable with lasers. However, we estimate that sufficient energy can be provided from auxiliary sources to practice the present invention with incoherent electromagnetic radiation. For example, a resistance heater can be employed to raise the temperature of the optical material and thereby reduce the radiant power required to form the surface pattern, or to subsequently propagate it into the optical material. Still other radiant sources and combinations thereof are possible.

What is claimed is:

1. A method of making an article characterized by steps comprising:
   (1) forming a surface pattern in an optical material by a first application of radiant electromagnetic energy that selectively removes a surface layer of said optical material, and
   (2) subsequently removing at least one additional layer of optical material underlying said surface layer by at least one additional application of radiant electromagnetic energy at a power density below the threshold at which a surface layer is removed from said optical material.

2. The method of claim 1 wherein the removal of said surface layer by said first application of radiant electromagnetic energy is facilitated by a layer of ablative material on said optical material.

3. The method of claim 2 wherein said ablative material is a metal.

4. The method of claim 3 wherein said metal is selected from the group consisting of aluminum, copper, gold, palladium, and titanium.

5. The method of claim 1 wherein said first application and said additional application of radiant electromagnetic energy are accomplished by means of the same source of said energy.

6. The method of claim 1 wherein said first application of radiant electromagnetic energy is accomplished by means of a first source of energy, and said additional application of radiant electromagnetic energy is accomplished by means of a second source of energy different from said first source.

7. The method of claim 1 wherein the removal of said surface layer is accomplished by a first application of radiant electromagnetic energy at a power level in excess of the threshold level at which surface lamterial is removed from said optical material by said energy.

8. The method of claim 1 wherein said additional application of radiant electromagnetic energy is accomplished with a beam having a larger cross-sectional area as compared to the cross-sectional area of the beam during said first application of radiant electromagnetic energy.

9. The method of claim 1 wherein said surface pattern is defined by a patter n of ablative material on said optical material, wherein said applications of radiant electromagnetic energy area accomplished with a beam having a larger cross-sectional area than the area of said pattern.

10. The method of claim 1 wherein said optical material is a birefringent material.

11. The method of claim 1 wherein said optical material is a single crystal.

12. The method of claim 1 wherein said optical material is a compound comprising at least one metallic species.

13. The method of claim 12 wherein said metallic species is selected from the group consisting of lithium, niobium, tantalum, strontium, and barium.

14. The method of claim 1 wherein said optical material is an electro-optic material.

15. The method of claim 1 wherein said optical material is selected from the group consisting of $LiNbO_3$, $SrBaNbO_3$, and $LiTaO_3$.

16. The method of claim 1 whyerein, at least one of said first and additional applications of electromagnetic energy is accomplished by means of a laser.

17. The method of claim 1 wherein said first application of radiant electromagnetic energy is at a first wavelength, and said additional application of radiant electromagnetic energy is at a second wavelength.

18. The method of claim 1 wherein an optical isolating groove is thereby formed.

19. The method of claim 1 wherein an optical device is thereby at least in part formed.

20. The method of claim 1 wherein an alignment feature is thereby formed.

21. The method of claim 20 wherein said alignment feature is a groove adapted to receive an optical fiber therein.

22. The method of claim 20 whereby said alignment feature is adapted to align two or more substrates of optical material.

23. The method of claim 20 whereby said alignment feature is adapted to align an optical device.

24. The method of claim 20 whereby said alignment feature is adapted for optically aligning said optical material during at least a portion of said making of said article.

25. The method of claim 1 wherein said removing of said optical material continues until the opposite surface of said optical material is penetrated.

26. The method of claim 1 further comprising the step of at least partially filling with a filling material the regions from which said optical material was removed.

27. The method of claim 26 wherein said filling material has a different refractive index than said optical material.

28. The method of claim 1 wherein said radiant electromagnetic energy is applied by means of a focussed laser beam, wherein the focal distance of said laser beam is different during a first application of laser energy as compared to the focal distance during a second application of laser energy.

29. The method of claim 1 wherein said surface pattern comprises two parallel lines adapted to defining an optical waveguide in said optical material.

30. The method of claim 29 wherein said optical waveguide is further defined by dopant material introduced to a given depth in said optical material.

* * * * *